United States Patent
Kang

(10) Patent No.: US 10,960,423 B1
(45) Date of Patent: Mar. 30, 2021

(54) PUMP CONTAINER

(71) Applicant: Min Gu Kang, Seongnam-si (KR)

(72) Inventor: Min Gu Kang, Seongnam-si (KR)

( * ) Notice: Subject to any disclaimer, the term of this patent is extended or adjusted under 35 U.S.C. 154(b) by 0 days.

(21) Appl. No.: 16/834,224

(22) Filed: Mar. 30, 2020

(30) Foreign Application Priority Data

Jan. 22, 2020 (KR) ........................ 10-2020-0008468

(51) Int. Cl.
    *B05B 11/00* (2006.01)
    *F16F 1/06* (2006.01)
    *F16F 1/04* (2006.01)

(52) U.S. Cl.
    CPC ...... *B05B 11/3077* (2013.01); *B05B 11/3092* (2013.01); *F16F 1/042* (2013.01); *F16F 1/06* (2013.01)

(58) Field of Classification Search
    CPC ......... F16F 1/06; F16F 1/042; B05B 11/3077; B05B 11/3092
    See application file for complete search history.

(56) References Cited

U.S. PATENT DOCUMENTS

| | | | | |
|---|---|---|---|---|
| 101,724 A | * | 4/1870 | French | F16F 1/048 267/166 |
| 2,607,582 A | * | 8/1952 | Jurgens | F16F 1/02 267/180 |
| 4,901,987 A | * | 2/1990 | Greenhill | F16F 1/06 267/166 |
| 5,558,393 A | * | 9/1996 | Hawkins | F16F 1/328 267/148 |
| 6,068,250 A | * | 5/2000 | Hawkins | F16F 1/328 267/148 |
| 6,669,184 B2 | * | 12/2003 | Cai | F16F 1/328 267/162 |
| 6,729,505 B2 | * | 5/2004 | Ramsey | B05B 11/3001 222/321.9 |
| 2012/0325861 A1 | * | 12/2012 | Pardonge | B65D 83/48 222/321.7 |

FOREIGN PATENT DOCUMENTS

KR              200428943       10/2006

* cited by examiner

*Primary Examiner* — Frederick C Nicolas
(74) *Attorney, Agent, or Firm* — Cantor Colburn LLP

(57) ABSTRACT

Provided is a pump container including a container body, a pump body having a cylindrical spring, a shoulder member, and a discharge nozzle. The cylindrical spring is made of a plastic material and includes: a top ring plate having a hole formed at the center thereof; a first spring member erectly extended downward from one side undersurface of the top ring plate, while rotating in a clockwise direction; a second spring member erectly extended downward from the other side undersurface of the top ring plate which is a position symmetrical to one side undersurface thereof, while rotating in the same direction as the first spring member; and a pair of connection spring members erectly extended downward from two center surfaces between one side undersurface and the other side undersurface of the top ring plate, while rotating in the opposite direction to the first spring member and the second spring member.

3 Claims, 5 Drawing Sheets

PUMP CONTAINER

BACKGROUND OF THE INVENTION

Field of the Invention

The present invention relates to a pump container, and more particularly, to a pump container that is capable of being configured to allow an internal volume of a cylindrical housing to be reduced by means of a pushing operation of a discharge nozzle to discharge a liquid contained therein to the outside and that is thus provided with a cylindrical spring located inside the cylindrical housing, made of an eco-friendly plastic material, and has first and second spring members twistedly extended from the undersurface of a top ring plate and a pair of connection spring members for connecting the first and second spring members therewith, so that suction of the liquid is easy, a pumping force for the liquid is good, and the pump container can be provided as an eco-friendly product, without the use of a steel spring.

Background of the Related Art

A container in which a fluid generally used for daily life is contained is provided with a small-sized manual pump, and whenever the pump is simply pressed, a predetermined amount of the fluid is discharged to the outside, thereby being easily provided for a user. Such pump container is called 'dispenser', and if the pump is pressed, the fluid stored in a chamber formed inside the pump is discharged to the outside through a nozzle. If a force pressing the pump disappears, the pump is moved upward back by means of an elastic force of a spring disposed between the container and the pump, and accordingly, the fluid of the container is sucked to the chamber in the pump.

Also, the dispenser is widely used for a shampoo container to easily discharge a shampoo stored in the shampoo container by a predetermined amount. In the past, the shampoo container is provided with a cap having a cover and a discharge hole for discharging a shampoo, but so as to discharge the shampoo, inconveniently, the shampoo container itself has to be pressed by a user. With structural advantages such as many conveniences in discharging the shampoo, suppression of excessive shampoo discharge, and prevention of shampoo consumption, recently, such dispenser has been mounted in most of shampoo containers.

A dispenser having the above-mentioned advantages is suggested in a conventional practice (Korean Utility Model Registration No. 20-0428943) as shown in FIG. 5. As shown, the conventional dispenser 100 includes a container 20 in which a liquid is stored, a housing 22 fixed to an opening of the container 20, extended downward therefrom, and having a negative pressure hole, a hollow shaft 23 moving up and down inside the housing 22 by means of a user's pushing operation, a piston 24 connected to the underside of the shaft 23 to pressurize or depressurize an interior of the housing 22, a nozzle head 31 communicating with the shaft 23 and fixed to top of the shaft 23, and a chaplet 26 fixed to top of the housing 22 in such a manner as to be located between the housing 22 and the shaft 23, wherein a spring 25 is located inside the housing 22 in such a manner as to come into contact with the underside of the piston 24, and a discharge hole is formed between the shaft 23 and the chaplet 26 to ensure air intake and exhaust.

Upon pumping in the conventional dispenser, the liquid has to be lifted up from the end, that is, the lowest end of a tube 30, and accordingly, a low pumping force as well as a high probability of a pumping failure occurs. Particularly, if the liquid has high viscosity, it is not pumped well to thus decrease a discharging force, and also, it is difficult to push the nozzle head 31. As the steel spring 25 is mounted inside the housing 22 in such a manner as to always come into contact with the liquid inside the container 20, in addition, a quality of the liquid may be deteriorated due to the corrosion of the spring 25, and as the number of parts constituting the dispenser 100 is too large, a manufacturing cost may be raised. As the steel spring is coupled to the part made of a plastic material, also, it cannot be recycled when the dispenser is thrown away.

SUMMARY OF THE INVENTION

Accordingly, the present invention has been made in view of the above-mentioned problems occurring in the related art, and it is an object of the present invention to provide a pump container that is capable of being configured to allow an internal volume of a cylindrical housing to be reduced by means of a pushing operation of a discharge nozzle to discharge a liquid contained therein to the outside and that is thus provided with a cylindrical spring located inside the cylindrical housing, made of an eco-friendly plastic material, and has first and second spring members twistedly extended from the undersurface of a top ring plate and a pair of connection spring members for connecting the first and second spring members therewith, so that suction of the liquid is easy, a pumping force for the liquid is good, and the pump container can be provided as an eco-friendly product, without the use of a steel spring.

To accomplish the above-mentioned object, according to the present invention, there is provided a pump container including: a container body for storing a liquid therein; a pump body seatedly fitted to an inner peripheral surface of a top opening of the container body and having a cylindrical spring; a shoulder member formed of a cylindrical member whose top and bottom are open and having a screw portion formed along a lower inner peripheral surface thereof in such a manner as to be coupled to the top opening of the container body and an upper periphery reduced smaller in diameter than a lower periphery in such a manner as to fit a top end periphery of the pump body thereto; and a discharge nozzle insertedly fitted to the top end periphery of the pump body in such a manner as to allow the pump body to be operated by means of a pushing operation thereof to discharge the liquid stored in the container body to the outside, wherein the cylindrical spring is made of a plastic material and includes: a top ring plate having a hole formed at the center thereof; a first spring member erectly extended downward from one side undersurface of the top ring plate, while rotating in a clockwise direction; a second spring member erectly extended downward from the other side undersurface of the top ring plate which is a position symmetrical to one side undersurface thereof, while rotating in the same direction as the first spring member; and a pair of connection spring members erectly extended downward from two center surfaces between one side undersurface and the other side undersurface of the top ring plate, while rotating in the opposite direction (in a counterclockwise direction) to the first spring member and the second spring member, in such a manner as to be connected alternately to tops and undersides of the first spring member and the second spring member.

According to the present invention, desirably, a width of the pair of connection spring members is smaller than widths of the first spring member and the second spring member, so that when the cylindrical spring is pressed, the first spring member and the second spring member are prevented from being open outward to increase the compressive force of the cylindrical spring.

According to the present invention, desirably, the pair of connection spring members is formed integrally with the first spring member and the second spring member.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
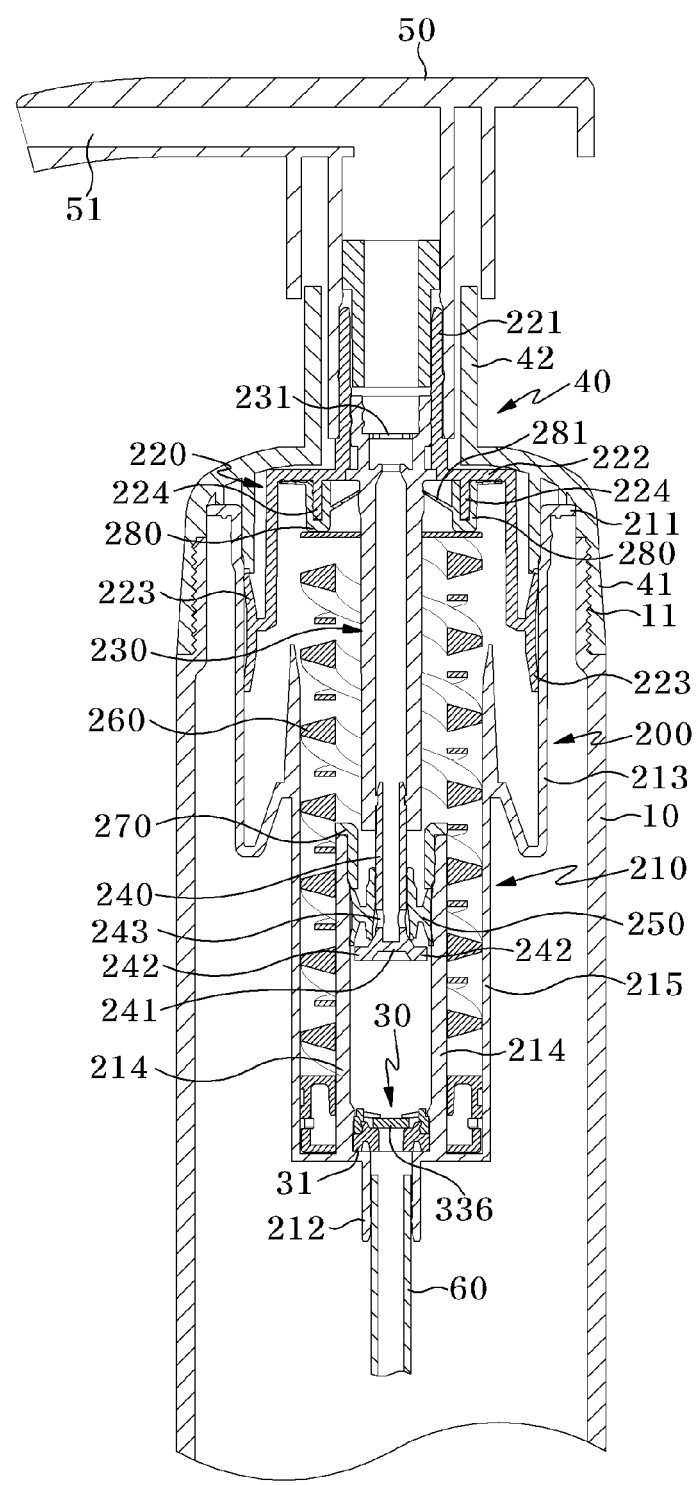
FIG. 1 is a sectional view showing a pump container according to the present invention.

Hereinafter, the present invention will be described with reference to the accompanying drawings; however, for reference numerals, with respect to the same elements, even though they may be displayed in different drawings, such elements use same reference numerals as much as possible. Also, in explaining the present invention, detailed description on known elements or functions will be omitted if it is determined that such description will interfere with understanding of the present invention. In the description, the thicknesses of the lines or the sizes of the components shown in the drawing may be magnified for the clarity and convenience of the description. Further, the terms as will be discussed later are defined in accordance with the functions of the present invention, but may be varied under the intention or regulation of a user or operator. Therefore, they should be defined on the basis of the whole scope of the present invention.

Now, an explanation on a pump container according to the present invention will be in detail given with reference to the attached drawing. If it is determined that the detailed explanation on the well known technology related to the present invention makes the scope of the present invention not clear, the explanation will be avoided for the brevity of the description.

Figure 2:
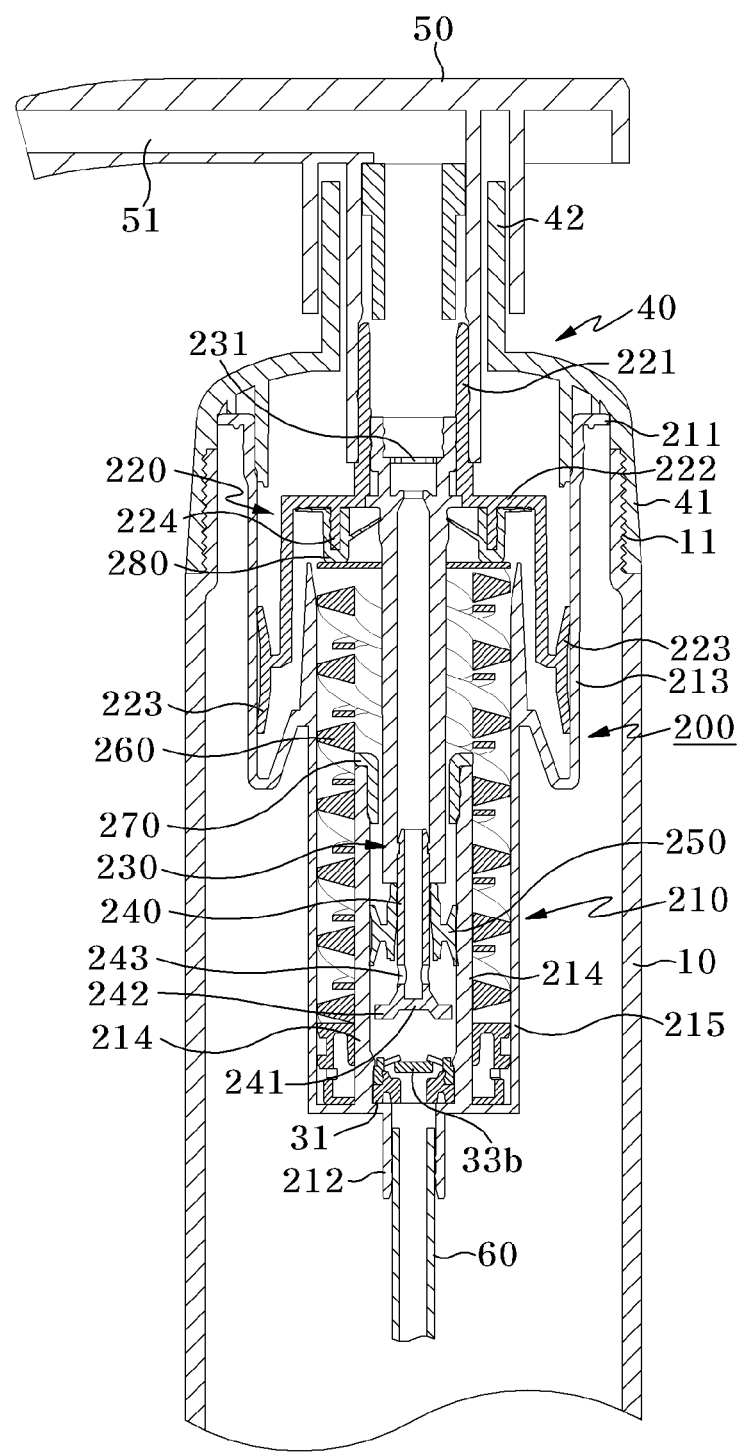
FIG. 2 is a sectional view showing an operation of the pump container according to the present invention.
Figure 3:
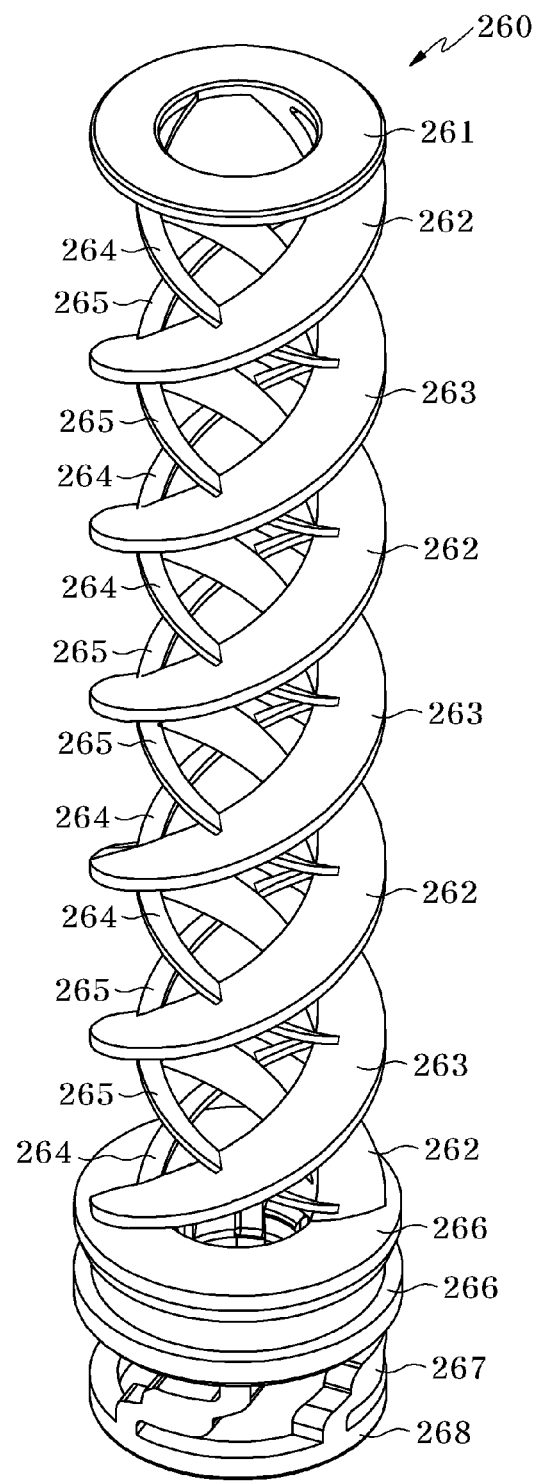
FIG. 3 is a perspective view showing a cylindrical spring of the pump container according to the present invention.
Figure 4:
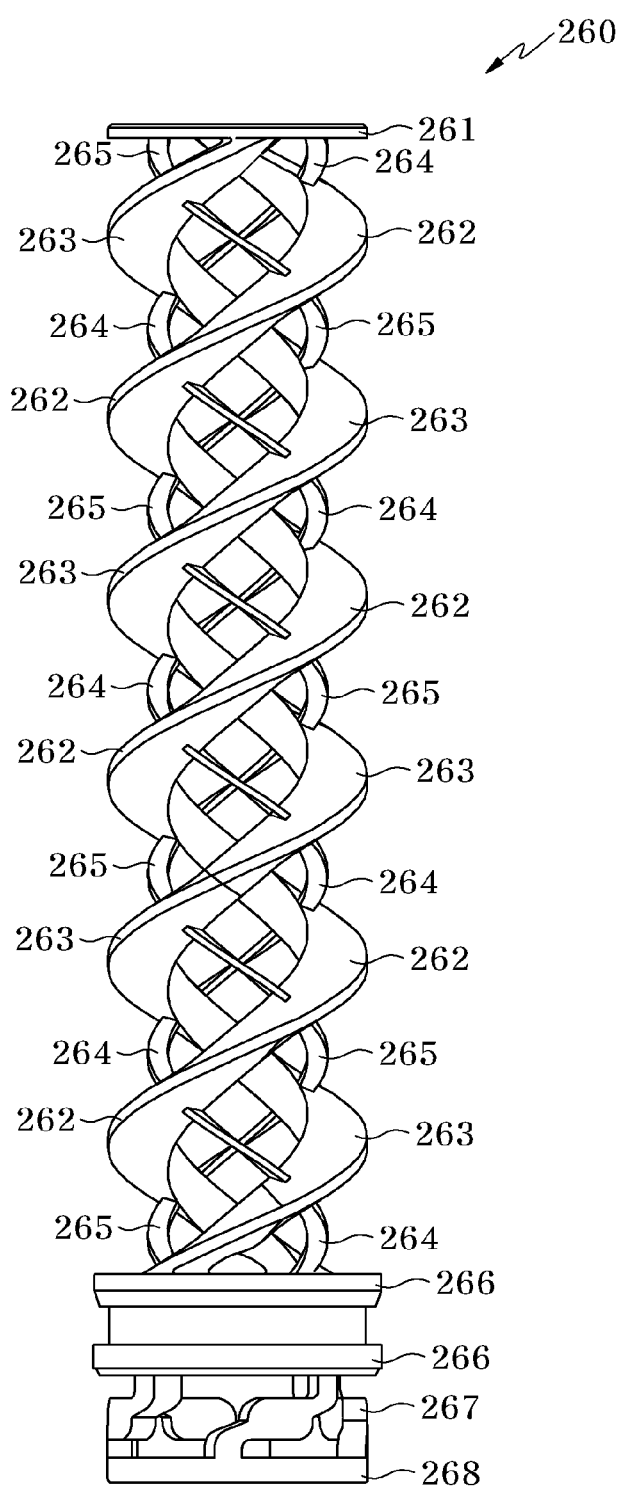
FIG. 4 is a front view showing the cylindrical spring of the pump container according to the present invention.
Figure 5:
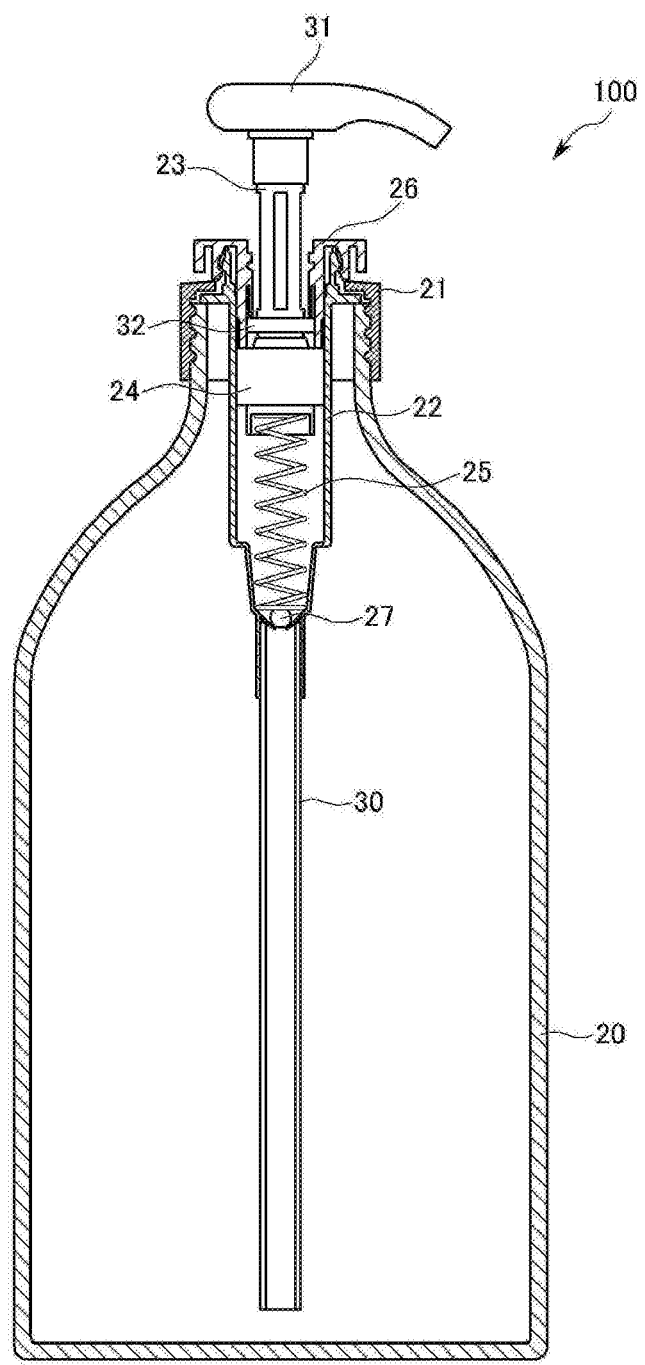
FIG. 5 is a sectional view showing a conventional pump container.

FIG. 1 is a sectional view showing a pump container according to the present invention, FIG. 2 is a sectional view showing an operation of the pump container according to the present invention, FIG. 3 is a perspective view showing a cylindrical spring of the pump container according to the present invention, and FIG. 4 is a front view showing the cylindrical spring of the pump container according to the present invention As shown in FIGS. 1 to 4, a pump container according to the present invention includes: a container body 10 for storing a liquid therein; a pump body 200 seatedly fitted to an inner peripheral surface of a top opening 11 of the container body 10; a shoulder member 40 formed of a cylindrical member whose top and bottom are open and having a screw portion formed along a lower inner peripheral surface thereof in such a manner as to be coupled to the top opening 11 of the container body 10 and an upper periphery 42 reduced smaller in diameter than a lower periphery 41 in such a manner as to fit a top end periphery of the pump body 200 thereto; and a discharge nozzle 50 insertedly fitted to the top end periphery of the pump body 200 in such a manner as to allow the pump body 200 to be operated by means of a pushing operation thereof to discharge the liquid stored in the container body 10 to the outside.

The pump body 200 includes: a cylindrical housing 210 having a top outer flange 211 coupled to the lower periphery 42 of the shoulder member 40 and a lower cylindrical pipe 212 coupled to a hose 60; a piston housing 220 having an upper cylinder 221 coupled to the lower inner peripheral surface of the discharge nozzle 50, an enlarged pipe 222 enlarged from the upper cylinder 221, a close-fitting plate 223 formed on an outer periphery of the enlarged pipe 222 in such a manner as to come into close contact with an upper inner peripheral surface of the cylindrical housing 210, and a circumferential protrusion 224 protruding downward from a center of the enlarged pipe 222; a piston coupling member 230 formed of a cylindrical member coupled to the upper cylinder 221 of the piston housing 220 and having a valve plate 231 formed along an upper inner peripheral surface thereof; a piston 240 formed of a cylindrical member coupled to a lower inner peripheral surface of the piston coupling member 230 and having a closed portion 241 whose top is open and whose bottom is closed, a projection 242 protruded outward from the closed portion 241, and a plurality of intake holes 243 penetrated into an outer peripheral surface thereof above the closed portion 242; an opening and closing packing member 250 fitted to the outer peripheral surface of the piston 240 in such a manner as to allow an outer peripheral surface thereof to be moved up and down, while coming into close contact with an inner peripheral wall 214 of the cylindrical housing 210, to open and close the plurality of intake holes 243 of the piston 240; a pump check valve 30 fitted to a lower inner peripheral surface of the inner peripheral wall 214 of the cylindrical housing 210; a cylindrical spring 260 fitted to a space between the inner peripheral wall 214 of the cylindrical housing 210 and an intermediate peripheral wall 215 erectedly spaced apart from an outer peripheral surface of the inner peripheral wall 214 by a given distance; an uplifting control member 270 formed of a ring-shaped member fitted to an upper inner peripheral surface of the peripheral wall 214 of the cylindrical housing 210 to control uplifting of the opening and closing packing member 250 so that upon uplifting of the piston 240, the opening and closing packing member 250 is located at a position capable of closing the plurality of intake holes 243 of the piston 240; and a surrounding member 280 adapted to surround the underside of the circumferential protrusion 224 of the piston housing 220.

The surrounding member 280 has a closing protrusion 281 protruding slantly from the inner peripheral surface thereof in such a manner as to come into close contact with the inner peripheral surface of the piston coupling member 230 to close the cylindrical housing 210, thereby preventing external air from being introduced into the cylindrical housing 210.

As shown in FIGS. 3 and 4, the cylindrical spring 260 is made of a plastic material and includes: a top ring plate 261 having a hole formed at the center thereof; a first spring member 262 erectly extended downward from one side undersurface of the top ring plate 261, while rotating in a clockwise direction; a second spring member 263 erectly extended downward from the other side undersurface of the top ring plate 261 which is a position symmetrical to one side undersurface thereof, while rotating in the same direction as the first spring member 262; a pair of connection spring members 264 and 265 erectly extended downward from two center surfaces between one side undersurface and the other side undersurface of the top ring plate 261, while rotating in the opposite direction (in a counterclockwise direction) to the first spring member 262 and the second spring member 263, in such a manner as to be connected alternately to tops and undersides of the first spring member 262 and the second spring member 263; a bottom ring plate 266 located to face the top ring plate 261 and to connect the bottom ends of the first spring member 262 and the second spring member 263 and the pair of connection spring members 264 and 265 thereto; and a circular bottom loop 268 extended from the underside of the bottom ring plate 266 in such a manner as to be connected to the bottom ring plate 266 by means of a plurality of tension posts 267.

A width of the pair of connection spring members 264 and 265 is smaller than widths of the first spring member 262 and the second spring member 263, so that when the cylindrical spring 260 is pressed, the first spring member 262 and the second spring member 263 are prevented from being open outward, thereby increasing the compressive force of the cylindrical spring 260.

The pair of connection spring members 264 and 265 is formed integrally with the first spring member 262 and the second spring member 263.

A reference numeral 51 not explained denotes an outlet of the discharge nozzle 50.

Next, an explanation on an operation of the pump container according to the present invention will be given.

If the discharge nozzle 50 is pressed down so as to use the pump container, first, the piston housing 220 coupled to the lower inner peripheral surface of the discharge nozzle 50 and the piston coupling member 230 coupled to the upper cylinder 221 of the piston housing 220 are descended, and accordingly, the piston 240 coupled to the lower inner peripheral surface of the piston coupling member 230 is descended.

Simultaneously, the opening and closing packing member 250 fitted to the outer peripheral surface of the piston 240 is pushed against the underside of the piston coupling member 230 and is thus descended along the inner peripheral surface of the inner peripheral wall 214 of the cylindrical housing 210. In detail, the opening and closing packing member 250 is spaced apart from the underside of the piston coupling member 230 by a given distance, and accordingly, the piston coupling member 230 pushes the opening and closing packing member 250 downward after the piston 240 has been descended, so that the opening and closing packing member 250 is descended after the piston 240.

Like this, the piston 240 has been first descended before the opening and closing packing member 250 is descended, so that the opening and closing packing member 250, which comes into close contact with the upper periphery of the projection 242 of the piston 240, becomes spaced apart from the upper periphery of the projection 242 of the piston 240 to allow the plurality of intake holes 243 to be open.

As the piston 240 and the opening and closing packing member 250 are descended, a volume in the inner peripheral wall 214 becomes reduced. As a result, the check valve 30, which is fitted to the lower inner peripheral surface of the inner peripheral wall 214, becomes open to allow the liquid to be introduced into the inner peripheral wall 214 (See FIG. 2).

The liquid introduced into the inner peripheral wall 214 is introduced into an interior of the piston 240 through both sides of the projection 242 and the intake holes 243 and is then discharged to the outside through the piston connection member 230 and the outlet 51 of the discharge nozzle 50.

If an operation of pushing the discharge nozzle 50 is stopped, the cylindrical spring 260 fitted to the space between the inner peripheral wall 214 and the intermediate peripheral wall 215 is operated to allow the first spring member 262 and the second spring member 263 to be expanded to ascend the piston housing 220.

The cylindrical housing 210, the piston 240, and the cylindrical spring 260 are made of a plastic material, and thus, they are eco-friendly.

Further, the cylindrical spring 260 is configured to have the first spring member 262 and the second spring member 263 twistedly extended from the undersurface of the top ring plate 261 in such a manner as to be connected with the pair of connection spring members 264 and 265, so that it can have good expansion and contraction, thereby making it easy to suck the liquid and thus consuming the liquid completely.

As described above, the pump container according to the present invention can be configured to allow the internal volume of the cylindrical housing to be reduced by means of the pushing operation of the discharge nozzle to discharge the liquid contained therein to the outside and that is thus provided with the cylindrical spring located inside the cylindrical housing, made of the eco-friendly plastic material, and has the first and second spring members twistedly extended from the underside of the top ring plate and the pair of connection spring members for connecting the first and second spring members therewith, so that suction of the liquid is easy, a pumping force for the liquid is good, and the pump container can be provided as an eco-friendly product, without the use of a steel spring.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A pump container comprising:
a container body (10) for storing a liquid therein;
a pump body (200) seatedly fitted to an inner peripheral surface of a top opening (11) of the container body (10) and having a cylindrical spring (260);
a shoulder member (40) formed of a cylindrical member, having an open top and an open bottom, and having a screw portion formed along a lower inner peripheral surface thereof in such a manner as to be coupled to the top opening (11) of the container body (10) and an upper periphery (42) reduced smaller in diameter than a lower periphery (41) in such a manner as to fit a top end periphery of the pump body (200) thereto; and
a discharge nozzle (50) insertedly fitted to the top end periphery of the pump body (200) in such a manner as to allow the pump body (200) to be operated by pushing the discharge nozzle (50) to discharge the liquid stored in the container body (10) to outside,
wherein the cylindrical spring (260) is made of a plastic material and comprises:

a top ring plate (261) having a hole formed at the center thereof;

a first spring member (262) erectly extended downward from one side undersurface of the top ring plate (261), while rotating in a clockwise direction;

a second spring member (263) erectly extended downward from other side undersurface of the top ring plate which is a position symmetrical to the one side undersurface thereof, while rotating in a same direction as the first spring member (262); and a pair of connection spring members (264 and 265) erectly extended downward from two center surfaces between one side undersurface and the other side undersurface of the top ring plate (261), while rotating in an opposite direction in a counterclockwise direction to the first spring member (262) and the second spring member (263), in such a manner as to be connected alternately to upper surfaces and bottom surfaces of the first spring member (262) and the second spring member (263).

2. The pump container according to claim 1, wherein a width of the pair of connection spring members (264 and 265) is smaller than widths of the first spring member (262) and the second spring member (263), so that when the cylindrical spring (260) is pressed, the first spring member (262) and the second spring member (263) are prevented from being open outward to increase the compressive force of the cylindrical spring (260).

3. The pump container according to claim 2, wherein the pair of connection spring members (264 and 265) is formed integrally with the first spring member (262) and the second spring member (263).

\* \* \* \* \*